July 16, 1935.   H. L. STALEY   2,008,369

AERATING DEVICE

Filed May 22, 1931

INVENTOR.
Harrison L. Staley

Patented July 16, 1935

2,008,369

UNITED STATES PATENT OFFICE 2,008,369

AERATING DEVICE

Harrison L. Staley, Martinsville, Ind.

Application May 22, 1931, Serial No. 539,329

3 Claims. (Cl. 261—119)

This invention relates to a form of aerator which is particularly adapted to aerating small aquariums for pet fish and, is an improvement on the type shown in my co-pending application filed February 13, 1931 and bearing Patent No. 1,920,220.

In my experimentation, I have discovered that if an open top vessel be inverted and, in this position, submerged in an aquarium so as to imprison a quantity of air within the body of the vessel and below the surface of the water, sufficient air would be dissolved by the pressure of the water against the imprisoned air to sustain fish life over a long period of time.

I have also found that for such a device to be practical in operation, sufficient weight should be incorporated in the body of the device so that it would be held by gravity on the bottom of the aquarium.

I have further found that such a device should have legs thereon or have holes in the lower sides thereof to permit the agitation of the water, produced by the swimming movement of the fish, to be carried to the point of contact between the imprisoned air and water so as to produce rapid diffusion of the dissolved air throughout the aquarium.

I have further discovered that if a hollow body, having openings on opposite ends thereof, is provided with a permeable septum over the top end, the lower end remaining open, and in this position submerged and held uprightly in the water to be aerated, absorption of air will take place both through the lower open end of the device and through the permeable septum. Such a device I have found to be of great utility, especially where the aquarium is overstocked with pet life and the water capacity small. An aerator of this character is partially disclosed in the above named co-pending application.

It is therefore the purpose of my invention to provide a simple, cheap and easily operated aerator for fish aquariums.

Figure 1:
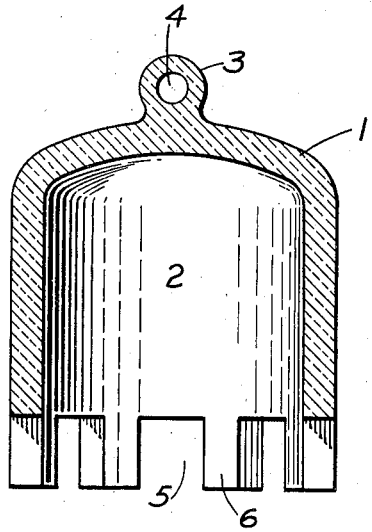
Figure 2:
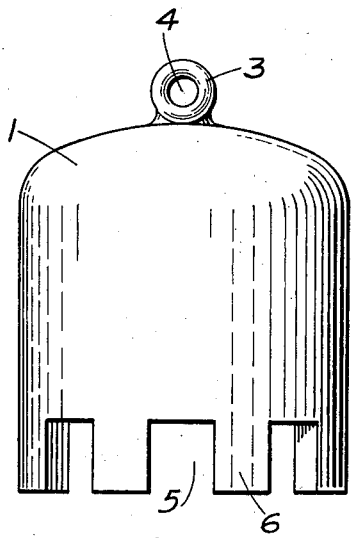
Figure 3:
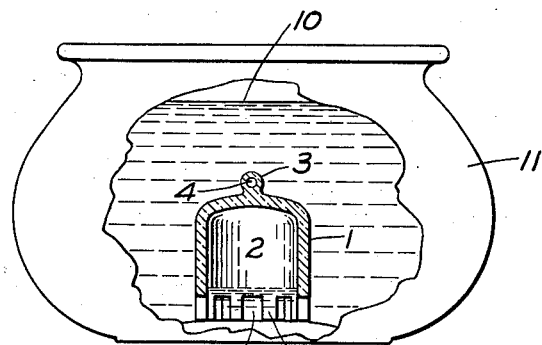
Figure 4:
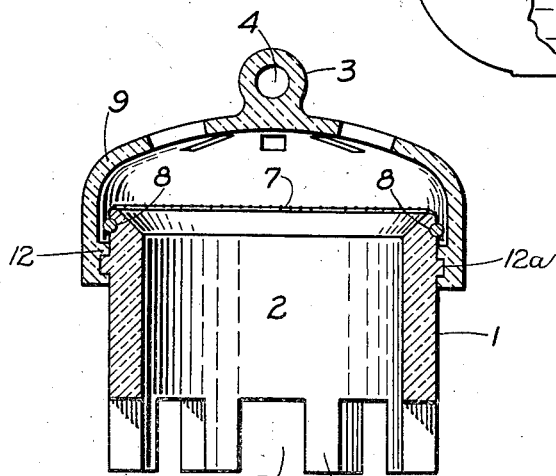

With these and other desirable objects in view, attention is directed to the accompanying drawing, in which Figure 1 shows a sectional view of my improved aerator; Figure 2 is a perspective view of the same device; Figure 3 is a sectional view of my invention placed in operative position in a fish aquarium, the side wall of which is partly removed; Figure 4 is a sectional view of a second form of my invention.

Referring to the drawing, the numeral 1 designates the body of the aerator which I have found advisable to make of non-corroding metal, earthenware or glass and in various decorative shapes such as diving bells, shells, castles etc. Body 1 is provided with chamber 2 which, when submerged below the surface of the water in an upright position, will imprison a quantity of air within the chamber 2 in direct contact with water 10. I prefer that body 1 have sufficient weight within itself to hold it on the bottom of the aquarium 11 by gravity.

As it is necessary to recharge the arerator with a supply of fresh air from time to time by withdrawing it from water 10, I provide means for accomplishing this without the introduction of the hand into the water of the aquarium. Ear 3 is fixedly secured on top of the body 1, said ear having an opening 4 therethrough for the introduction of a wire hook or chain with which to withdraw the aerator from the water. Ear 3 should be placed vertically above the center of gravity of body 1 so that when said body is suspended by hook or chain, it will maintain a vertical position. I have found that unless the aerator is suspended vertically above its center of gravity when being introduced into the water, large air bubbles will escape from the air chamber 2 which greatly lessens its aerating capacity.

On the lower portion of body 1, openings 5 are provided in the body to permit the agitation of water 10 to be carried into the open end of the aerator. The agitation produced by the swimming fish is necessary for the rapid dissolution and diffusion of the dissolved air and I find that if openings 5 are large enough for a swimming fish to pass therethrough, such dissolution and diffusion of air is greatly expedited. It will be observed that openings 5 are, in fact, spaces between legs 6 on which the aerator rests.

In the second form of my invention, as disclosed in Figure 4, the numeral 7 indicates a permeable septum which is secured over the top opening in body 1. Septum 7 is removably attached to body 1 by any practical means, but preferably by securing the outer edge of septum 7 in an annular groove 8 by a cord or spring clasp. A perforated guard 9 is removably secured by engaging lugs 12. These lugs are oppositely disposed and extend only partially around the interior wall of guard 9. Corresponding lugs on the body 1 extend outwardly from said body, said lugs having a groove therein for the introduction of lugs on said guard 9. To place guard 9 in operating position it is only necessary to introduce the lugs on guard 9 into the intervening space between lugs on body 1 and slightly rotate guard 9. If guard 9 is utilized in this form of aerator, ear 3 should be fixedly secured to said guard.

In operation, the aerator is suspended by ear 3 which brings the aerator into a vertical position and while in this position it is submerged in water 10 of aquarium 11. This movement imprisons a quantity of air in chamber 2 and brings it in direct contact with said water 10. Then, as fish consume the dissolved air in water 10, dissolution of the air from chamber 2 continues until the air in said chamber is exhausted when it is necessary to recharge the aerator again by withdrawing it from the aquarium. I find that when a permeable septum 7 is used in an aerator of this type (see Figure 4) the air in chamber 2 is dissolved also through said septum. It is obvious that all water which may percolate through septum 7 gravitates to the bottom of the aerator to commingle with the water pressing against the air and as the percolated water is completely saturated with dissolved air, such dissolved air is immediately available for fish life by diffusion through the lower open end of the aerator.

It is to be understood that by the nomenclature, "air," is meant in fact, oxygen. I have found in my experimentation that unless the water is completely saturated with air both oxygen and nitrogen are absorbed. But as fish consume only dissolved oxygen, very little absorption of nitrogen takes place after the water reaches the saturation point with this element. It is then that only oxygen is taken out of the air in chamber 2.

The rate of absorption in aerators of this type follows the general law, that absorption of a gas by a liquid is directly proportional to the pressure applied. The pressure in this instance is proportional to the depth of the water in the aquarium.

Having fully described my invention, I claim as new:

1. An aerating device for a live fish container comprising a hollow body, having for its topmost end a permeable element, said body having openings through the wall thereof at its lower end to permit water to pass freely below the air confined in said body, and said body being of sufficient weight to maintain a vertical position in operation.

2. An aerating device for a live fish container having a hollow, porous, earthenware body, legs on said body extending downwardly to permit water to pass freely below the air confined in said body, substantially as described.

3. An aerating device for a live fish container having a hollow, porous, earthenware body, legs on said body extending downwardly to permit water to pass freely below the air confined in said body, and said device being of sufficient weight to maintain a vertical position in operation.

HARRISON L. STALEY.